United States Patent Office 3,098,072
Patented July 16, 1963

3,098,072
IMPROVED PROCESS FOR PHOSPHORYLATING AMINO-ALCOHOLS
Emile Cherbuliez, Conches, Geneva, and Joseph Rabinowitz, Geneva, Switzerland, assignors to Ciba Corporation, a corporation of Delaware
No Drawing. Filed Apr. 30, 1958, Ser. No. 731,878
Claims priority, application Switzerland May 3, 1957
3 Claims. (Cl. 260—247)

The invention provides a new process for the manufacture of phosphoric acid monoesters and/or condensation products, such as heterocyclic compounds, for example, of morpholines and piperazines, by the treatment of amino-alcohols, advantageously 2-amino-alcohols, with pyrophosphoric acid or polyphosphoric acids.

The phosphorylation of amino-alcohols has often been studied, especially with respect to the biochemical and pharmacological interest of phosphoric acid esters of certain amino-alcohols, for example, of choline and of 2-aminoethanol. Among the processes used, the processes which give the most satisfactory results such as a yield of 15–50% strength are those in which pyrophosphoric acid or a polyphosphoric acid or a corresponding mixture of phosphoric acid and phosphorus pentoxide is used as phosphorylating agent. There is generally used as starting material pyrophosphoric acid in a proportion amounting to 1.5–2.0 molecular proportions calculated on a hydroxyl group to be phosphorylated and temperatures in the vicinity of 100° are used. However, this procedure involves considerable losses. These losses are probably due for the greater part to adsorption phenomena, which occur during the removal of the excess of phosphorylating agent and of the phosphoric acid formed during the reaction in the form of an alkaline earth metal salt thereof. This separation is possible because the latter salts are sparingly soluble whereas the alkaline earth metal salts of the phosphoric acid esters are easily soluble. As 5–8 molecular proportions of inorganic phosphate are formed per molecular proportion of organic phosphate a considerable amount of precipitate is formed. It is therefore necessary to work with large quantities of water. This necessitates the use of lengthy operations of filtration and evaporation, whereby the risk of hydrolysis is also increased. The phosphoric acid and polyphosphoric acids also cause side reactions, such as intermolecular or intramolecular condensations of the amino-alcohols. These side reactions, of which little or no mention is made in the literature, can become the principal reactions by using amino-alcohols which contain an aryl radical, such as a phenyl radical, as a substituent at the nitrogen.

The present invention is based on the observation that in the treatment of amino-alcohols with pyrophosphoric acid or a polyphosphoric acid the aforesaid disadvantages are wholly or partially avoided by using less than one molecular proportion, and especially about 0.5 molecular proportion, of pyrophosphoric acid or a proportion of a polyphosphoric acid containing the same number of phosphorus atoms, calculated on an esterifiable hydroxyl group, and working at a temperature above 140° C., and advantageously within the range of 150–250° C., and under reduced pressure, and advantageously under a pressure below 50 mm. of mercury, for example, at 3–30 mm. pressure of mercury.

In this process the phosphoric acid formed in the reaction according to the equation

R—OH+H₄P₂O₇→R—OPO₃H₂+H₃PO₄ is reconverted into pyrophosphoric acid or polyphosphoric acid, which is available for further phosphorylation until all the hydroxyl groups present have entered into reaction. Accordingly, at the end of the reaction there are present only small amounts of inorganic phosphorus compounds, and therefore large quantities of precipitates of alkaline earth metal salts of phosphoric acid or of pyrophosphoric acid are not formed during the working up. This considerably simplifies the operations of filtration and concentration. Losses by adsorption are small; losses due to condensation are generally reduced. As compared with the known processes the yields are considerably enhanced and amount to 50–100%.

However, even under the conditions of the process of this invention condensation products are formed, especially by ring closure, under the influence of the phosphorylating agent used. When certain 2-aminoalcohols are used as starting material there are generally obtained piperazine or morpholine compounds. When further hydroxyl groups are present, in addition to the hydroxyl groups necessary for ring formation, the former are phosphorylated. In these cases the starting materials react almost quantitatively to form phosphoric acid esters of cyclic hydroxy-compounds. However, when a product having no esterifiable hydroxyl groups is formed by the condensation, such a product is formed only as a by-product, and the phosphoric acid ester of the amino-alcohol used as starting material is obtained in a yield of 50–80%. However, amino-alcohols in which the nitrogen atom is substituted by an aryl radical, such as a phenyl radical, behave differently. When stable rings can be formed, ring closure takes place almost exclusively.

Accordingly, depending on the starting materials used there are three different possibilities:

(A) Direct phosphorylation of the amino-alcohol without any substantial formation of condensation products. This is the most common possibility. The yields amount to 50–100%.

(B) Condensation of the amino-alcohol and phosphorylation of the hydroxyl groups which remain. The yields are excellent. In the literature no example has yet been described of a simultaneous ring closure and phosphorylation. In this case the process of the invention has an advantage: The phosphoric acid esters are formed in a single process step.

(C) Ring closure of the amino-alcohol with the formation of only small amounts of a phosphoric acid monoester. The esterification is to be regarded only as a side reaction. The yields of cyclic compounds are excellent and almost quantitative. However, cases of this kind are very rare. In general it applies only to reaction of a 2-amino-alcohol of which the nitrogen atom is substituted by an aryl radical, such as a phenyl radical.

The esters obtained by the process of this invention are phosphoric acid monoesters. They are therefore esters of phosphoric acids of which only one hydroxyl group has been esterified. Depending on the procedure used they are obtained in the form of the free acids or salts thereof. From the salts the free acids may be prepared and from the free acids salts may be prepared, such as those of alkali metals or alkaline earth metals. Especially important are the alkaline earth metal salts, especially the calcium salts, as they are easily soluble in water. The salts and acids act as buffers in various pH-ranges. Resulting bisphosphoric acid mono-esters of dihydroxy compounds can be very easily converted under mild conditions into mono-phosphoric acid mono-esters. An aqueous solution of the bis-ester is heated for a short time, e.g. 30 minutes at about 100° C., preferably in the presence of a little acid, such as dilute hydrochloric acid or sulfuric acid, or of a base, such as sodium hydroxide or sodium carbonate. The resulting mono-esters are then isolated in the usual manner.

As amino-alcohols there are used preferably amine compounds substituted with at least one hydroxy-hydrocarbon radical, such as a hydroxy aliphatic hydrocarbon radical, for example with a hydroxy-alkyl radical, particularly a hydroxy lower alkyl radical. The hydroxyl group is preferably separated from the amino group by at least two carbon atoms.

The compounds obtained by the process of this invention can be used for a very wide variety of purposes. Thus, they may be used as medicaments, especially in the form of their calcium salts, or as buffers or as cleansing agents.

The following examples illustrate the invention:

*Example 1*

Into a flask is placed 0.20 to 0.22 mol of pyrophosphoric acid or a quantity of a polyphosphoric acid containing the same number of phosphorus atoms, which has been prepared in the usual manner, for example, by starting with commercial phosphoric acid, and heating it or dissolving therein the necessary quantity of phosphorus pentoxide. 0.20 mol of di-(2-hydroxy-propyl)-amine is added slowly and while vigorously agitating the contents of the flask. These quantities correspond to 0.5 mol of pyrophosphoric acid per hydroxyl group to be phosphorylated. The mass heats up owing to the liberation of heat of neutralization, so that it is necessary to cool the mixture throughout the addition. As soon as the evolution of heat ceases, the flask is placed in a bath and the temperature is slowly raised until the contents of the flask reach a temperature of at most 170° C. At the same time a reduced pressure of 3–20 mm. of mercury is produced in the flask, for example, a reduced pressure produced wtih a water jet pump. The aforesaid temperature and reduced pressure are maintained for 30–40 hours. The reaction mixture is then taken up in water and the resulting bis-phosphoric acid monoester of di-(2-hydroxy-propyl)-amine of the formula

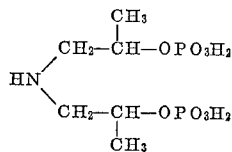

is isolated rapidly at room temperature in the usual manner.

The isolation may be carried out, for example, by first neutralizing the mixture with the carbonate and then with the hydroxide of an alkali metal, for example, of calcium, until a pH-value is reached at which phenolphthalein paper just changes color. In this manner the phosphoric acid and pyrophosphoric acids are precipitated in the form of their salts whereas the salt of the ester remains in solution. After separating the precipitate, which is formed only in a small amount, it is washed with water, and the aqueous solution is concentrated in vacuo, and the phosphoric acid mono-ester is isolated therefrom in the form of its alkaline earth metal salt, such as its calcium salt, or in the form of the free acid, by adding the quantity of sulfuric acid necessary to remove the alkaline earth metal ions.

The free acid so obtained, which is very hygroscopic, is dried in vacuo. The yield amounts to 85–90%. Its salts are very easily soluble in water. The acid acts as a buffer in certain pH-ranges, for example, in a range of 1.5 to 3, 5 to 7 and 9 to 11. It can also be used as a cleansing agent.

*Example 2*

The following phosphoric acid monoesters of the amino-alcohols mentioned below are prepared in a manner analogous to that described in Example 1:

The 2-aminoethanol ester of the formula $H_2N—CH_2—CH_2—OPO_3H_2$; M.P.=237° C.

The 2-methylamino-ethanol ester of the formula $CH_3NH—CH_2—CH_2—OPO_3H_2$; M.P.=194° C.

The 2-dimethylaminoethanol ester of the formula $(CH_3)_2N—CH_2—CH_2—OPO_3H_2$; M.P.=78–81° C.

The 2-ethylamino-ethanol ester of the formula $C_2H_5NH—CH_2—CH_2—OPO_3H_2$; M.P.=214° C.

The 2-diethylaminoethanol ester of the formula $(C_2H_5)_2N—CH_2—CH_2—OPO_3H_2$
M.P.=118–123° C.

The 3-amino-propanol ester of the formula $H_2N—CH_2—CH_2—CH_2—OPO_3H_2$; M.P.=179° C.

The 2-amino-propanol ester of the formula

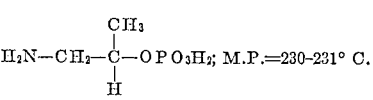

The 1-amino-propanol-(2) ester of the formula

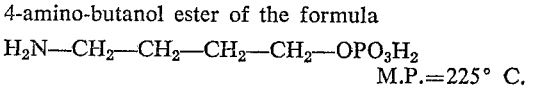

The 4-amino-butanol ester of the formula $H_2N—CH_2—CH_2—CH_2—CH_2—OPO_3H_2$
M.P.=225° C.

The 2-amino-butanol ester of the formula

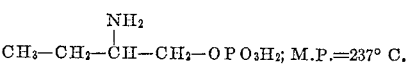

The 2-amino-2-methyl-propanol ester of the formula

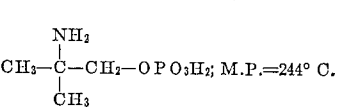

The 5-amino-pentanol ester of the formula $H_2N—CH_2—CH_2—CH_2—CH_2—CH_2—OPO_3H_2$
M.P.=240° C.

The 6-amino-hexanol ester of the formula $H_2N—CH_2—CH_2—CH_2—CH_2—CH_2—CH_2—$
$OPO_3H_2$; M.P.=247° C.

The 2-(2′-amino-ethylamino)-ethanol ester of the formula $H_2N—CH_2—CH_2—NH—CH_2—CH_2—OPO_3H_2$; isolated as mono-calcium salt The N-(2-hydroxy-ethyl)-morpholine ester of the formula

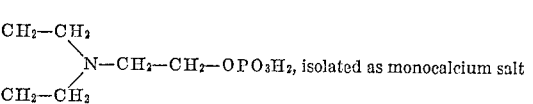

The above esters may be prepared, for example, by adding 0.2 mol of one of the above-mentioned amino-alcohols to 0.10 to 0.11 mol of pyrophosphoric acid, and, depending on the starting material used, heating the mixture for 5–50 hours at a temperature of 150–200° C. and under a pressure of 3–30 mm. of mercury. The phosphoric acid monoesters so obtained may be isolated in the form of the free acids or a salt thereof, for example, the calcium salt. The acids can be converted into their salts in the usual manner.

*Example 3*

In a manner analogous to that described in Example 1, 0.1 mol of tri-(2-hydroxy-propyl)-amine is reacted with 0.07 to 0.10 mol of pyrophosphoric acid or a corresponding quantity of a polyphosphoric acid. The mixture is heated for 15–30 hours, preferably for 20 hours. The reaction proceeds as follows:

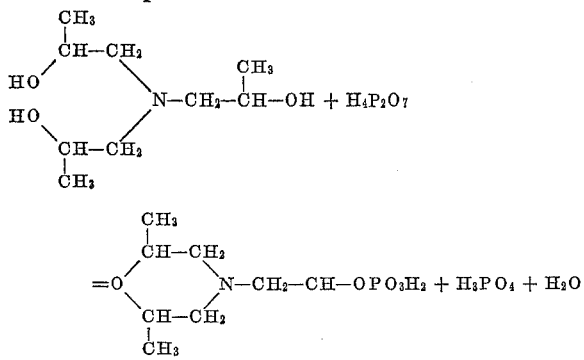

The phosphoric acid monoester of N-(2'-hydroxypropyl)-2:6-dimethyl-morpholine so obtained may be isolated in the form of a salt, such as the calcium salt, or as the free acid. The yield amounts to about 80%.

*Example 4*

By treating 0.1 mol of tri-(2-hydroxy-ethyl)-amine with 0.07–0.10 mol of pyrophosphoric acid in the manner described in Example 3, there is obtained the phosphoric acid monoester of N-(2-hydroxy-ethyl)-morpholine as described in Example 2. Yield: 60%.

*Example 5*

In a manner analogous to that described in the above examples 0.20 mol of di-(2-hydroxy-ethyl)-amine is treated with 0.20 to 0.22 mol of pyrophosphoric acid, and there is obtained the bis-phosphoric acid monoester of 1:4-di-(2'-hydroxy-ethyl)-piperazine of the formula

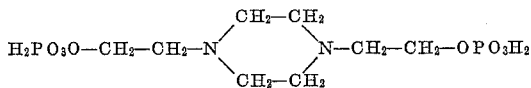

and in a similar manner there is obtained by starting from 2-amino-2-methyl-propane diol-(1:3) the bis-phosphoric acid monoester of 2:5-di-hydroxymethyl-2:5-dimethyl-piperazine of the formula

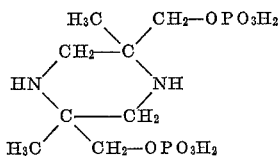

*Example 6*

0.2 mol of 2-phenylamino-ethanol is heated for 10–20 hours at 180° C. under a pressure of 100 mm. of mercury with 0.1 mol of pyrophosphoric acid. The reaction mixture is then treated with water, filtered, and the filter residue is washed completely with water and dried. There is obtained in almost quantitative yield, that is to say about 0.1 mol, 1:4-diphenyl-piperazine of the formula

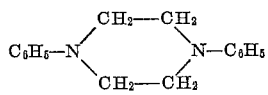

This reaction can also be carried out at a raised temperature, the reaction mixture being advantageously heated for a short time, for example for 6–7 hours at 230–240° C. under 100 mm. pressure.

*Example 7*

The reaction mass obtained as described in Example 1 by heating pyrophosphoric acid and di-(2-hydroxypropyl)-amine is taken up in water, and the solution heated for 30 minutes at 100° C. After this pretreatment of the aqueous solution, the resulting mono-phosphoric acid-mono-ester of di-(2-hydroxypropyl)-amine of the formula

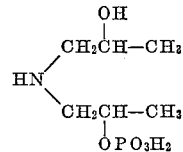

is isolated in the usual manner.

*Example 8*

0.1 mol of N-methyl-diethanolamine is heated with 0.1 mol of pyrophosphoric acid for 20 hours at 170° C. under about 15 mm. pressure of mercury. In addition to about 5% of a mixture of N-methyl-diethanolamine mono- and di-phosphoric acid esters, the reaction mass contains chiefly N-methyl-morpholine of the formula

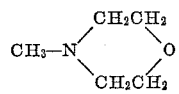

For the purpose of isolation the reaction mixture is taken up in water, the mixture is rendered alkaline and distilled. N-methyl-morpholine is obtained as aqueous distillate.

What is claimed is:

1. In a process of treating an amino-alcohol with a phosphorylating agent the improvement which consists in using as the phosphorylating agent a member selected from the group consisting of pyrophosphoric acid and polyphosphoric acid in an amount at least about 0.5 mol but less than the stoichiometric amount necessary to form the phosphoric acid monoester, at a temperature between 150° and 250° C. and under a reduced pressure of 3–30 mm. of mercury.

2. In a process of treating an amino alcohol with a phosphorylating agent the improvement which consists in using as the phosphorylating agent a member selected from the group consisting of pyrophosphoric acid and polyphosporic acid in an amount at least about 0.5 mol but less than the stoichiometric amount and about half of that necessary to form the phosphoric acid monoester, at a temperature between 150° and 250° C. and under a reduced pressure of 3–30 mm. of mercury.

3. In a process of treating an amino-alcohol with a phosphorylating agent the improvement which consists in using as the phosphorylating agent a member selected from the group consisting of pyrophosphoric acid and polyphospohoric acid in an amount at least about 0.5 mol but less than the stoichiometric amount necessary to form the phosphoric acid monoester, at a temperature between 150° and 250° C. and under a reduced pressure of 3–30 mm. of mercury, and hydrolyzing a resulting bisphosphoric acid mono-ester of a dihydroxy compound to the monophosphoric acid mono-ester.

References Cited in the file of this patent
UNITED STATES PATENTS

| | | |
|---|---|---|
| 2,304,890 | Dickey | Dec. 15, 1954 |
| 2,863,868 | Chabrier et al. | Dec. 9, 1958 |

FOREIGN PATENTS

| | | |
|---|---|---|
| 992,802 | France | July 11, 1951 |

OTHER REFERENCES

Cherbuliez: Helv. Chim. Acta, vol. 39, pages 1455–61, abstracted from Chem. Abst., vol. 51, col. 3447–9 (1957).